(12) United States Patent
Ichnowski

(10) Patent No.: US 7,451,086 B2
(45) Date of Patent: Nov. 11, 2008

(54) METHOD AND APPARATUS FOR VOICE RECOGNITION

(75) Inventor: Jeanne Ichnowski, Palo Alto, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 467 days.

(21) Appl. No.: 11/133,842

(22) Filed: May 19, 2005

(65) Prior Publication Data

US 2006/0265225 A1 Nov. 23, 2006

(51) Int. Cl.
*G10L 15/18* (2006.01)
(52) U.S. Cl. ..................... 704/257; 704/270; 704/270.1
(58) Field of Classification Search .............. 704/270.1, 704/231, 270, 7, 9, 257, 275; 717/127; 379/88.02
See application file for complete search history.

(56) References Cited

U.S. PATENT DOCUMENTS

| 6,891,932 | B2 * | 5/2005 | Bhargava et al. | 379/88.02 |
| 7,231,636 | B1 * | 6/2007 | Evans | 717/127 |
| 7,251,604 | B1 * | 7/2007 | Thenthiruperai | 704/270.1 |

* cited by examiner

*Primary Examiner*—Huyen X. Vo

(57) ABSTRACT

A voice recognition system according to embodiments of the present invention includes a recognizer; a grammar operably coupled to the recognizer, the grammar defining utterances to be recognized; a processing application configured to receive an output of the recognizer, the output including a tag element having a semantic content and including an embedded instruction for said processing application, such that said processing application can process the instruction independent of a semantic content of the tag element.

19 Claims, 3 Drawing Sheets

US 7,451,086 B2

METHOD AND APPARATUS FOR VOICE RECOGNITION

BACKGROUND OF THE INVENTION

1. Field of the Invention

The present invention relate to telecommunications systems and, in particular, to an improved voice recognition system.

2. Description of the Related Art

In speech recognition systems, developers can define a grammar that specifies words and phrases that are listened for by a speech recognizer. Speech recognizers that operate in accordance with the Speech Recognition Grammar Specification (SRGS) may provide an output in the form of a "tag," i.e., a semantic interpretation of the input word or phrase. The tag is used to resolve different words and phrases to the same result.

For example, a grammar can be designed to recognize various ways a user might ask for "vanilla ice cream," e.g., "I want vanilla ice cream," or "Vanilla, please," or "Give me some vanilla." The semantic interpretation for all of these could simply be "vanilla," and a tag could be used to encode that information for the processing application (typically a VXML browser), e.g., tag="vanilla." The processing application then performs one or more functions based on the tag.

The processing application is thus dependent on the tag and grammar. That is, the processing application itself must be individually programmed for each tag and grammar. As can be appreciated, this can result in additional complexity and development time.

SUMMARY OF THE INVENTION

These and other drawbacks in the prior art are overcome in large part by a system and method according to embodiments of the present invention.

A voice recognition system according to embodiments of the present invention includes a recognizer; a grammar operably coupled to the recognizer, the grammar defining utterances to be recognized; a processing application configured to receive an output of the recognizer, the output including a tag element having a semantic content and including an embedded instruction for said processing application, such that said processing application can process the instruction independent of a semantic content of the tag element.

A method according to embodiments of the present invention includes providing a recognizer; providing a grammar programming unit, the grammar programming unit including a tag encoding unit for encoding instructions in a tag; providing a processing application configured to read and execute said instructions without processing a semantic content of said tag.

A telecommunications system according to embodiments of the present invention includes a network; a plurality of user devices operably coupled to the network; a voice recognition unit accessible by said user devices, said voice recognition unit including a recognizer configured to receive a voice input; a grammar operably coupled to the recognizer, the grammar defining utterances to be recognized; a processing application configured to receive an output of the recognizer, the output including a tag element having a semantic content and including an embedded instruction for said processing application, such that said processing application can process the instruction independent of a semantic content of the tag element

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2 is a flowchart illustrating operation of an embodiment of the present invention.

DETAILED DESCRIPTION OF EMBODIMENTS OF THE INVENTION

Figure 1:
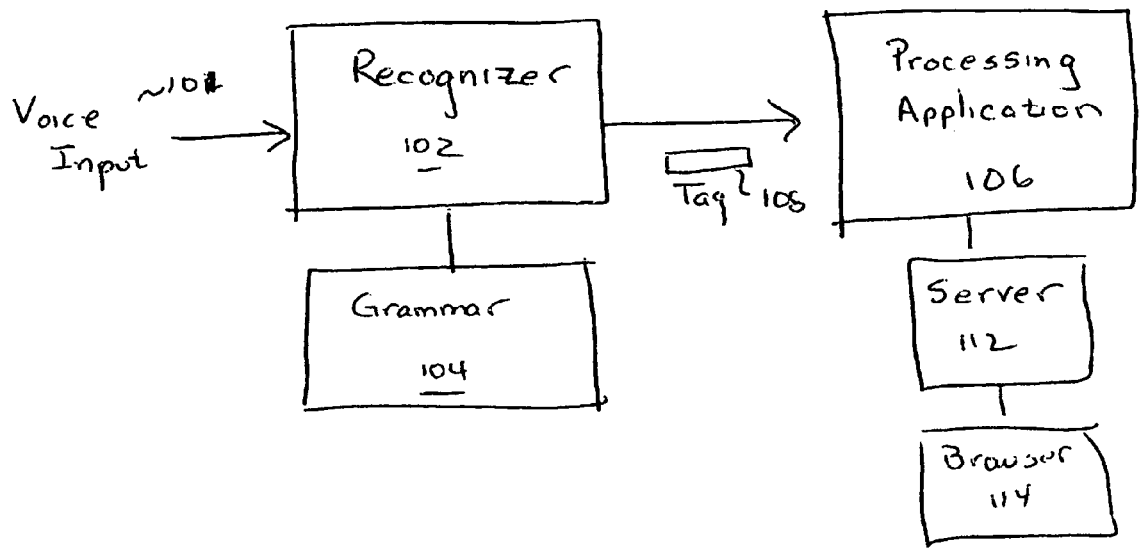
FIG. 1 is a diagram schematically illustrating a system according to embodiments of the present invention.

Turning now to the drawings and, with particular attention to FIG. 1, a diagram of a voice recognition system 100 according to an embodiment of the present invention is shown. The voice recognition system 100 may be associated with, for example, a voice messaging or interactive voice response or other service. The voice recognition service 100 may include, be connected to, or in communication with a recognizer 102, a programmable grammar 104, and a processing application 106.

The grammar 104 stores words and phrases to be recognized. In addition, the grammar 104 stores tags 108 that are output to the processing application 106 when an utterance is identified. As will be described in greater detail below, the tags 108 may include one or more embedded functions.

The recognizer 102 receives user inputs, accesses the grammar 104, and performs a recognition. A typical recognizer that may be adaptable for use with embodiments of the present invention is the Speechworks System available from Scansoft. The recognizer 102 performs a semantic interpretation of the words or phrases input, and returns a tag indicative of the semantic interpretation to the processing application 106. In addition, as will be explained in greater detail below, the tag is encoded in accordance with embodiments of the present invention. In response to the tag's encoding, the processing application 106 performs one or more functions, as will be described in greater detail below. A grammar programming module (FIG. 3) may be provided to encode the functions of the tag.

The processing application 106 may be embodied as a VXML application, i.e., a VXML server 112 that interacts with a VXML client browser 114 at one or more user devices. The server 112 generates the VXML for the client browser 114 to execute. The client browser 114 includes handling scripts for executing the VXML and responding to the embedded tag.

In operation, a user may call in or log in to the voice recognition system. A voice input of one or more utterances 101 may be detected and processed by the recognizer 102. If the word is recognized, i.e., is present in the grammar, then the corresponding tag, or semantic interpretation, is accessed, and provided to the processing application 106. As noted above, the tag 108 may also include one or more encoded commands. For example, the tag could include a coded command for the processing application to identify a prompt to be played, or an URL to be displayed, or other information related to processing functions. The processing application 106 does not itself need to further interpret the tag. Further, completely different user interfaces may be provided simply by defining a grammar and encoded tags, without having to re-write the processing application 106.

Reference is now made to FIG. 2, which illustrates a flowchart of operation of an embodiment of the present invention. The particular arrangement of elements in the flowchart 200 is not meant to imply a fixed order to the elements; embodiments can be practiced in any order that is practicable.

In a step 202, the recognizer 102 (FIG. 1) receives a user input 101. As noted above, this can include utterances such as words or phrases. In particular, the user input can be provided by a caller calling in to access the system. In a step 204, the recognizer 102 will access the grammar 104. As will be explained in greater detail below, the grammar 104 may be defined by a system administrator or other authorized personnel. Also, as noted above, the grammar defines the words and phrases that are to be recognized, as well as the semantic interpretation to be accorded those words and phrases.

In a step 206, the recognizer 102 can recognize the word or phrase and access the corresponding tag 108. As discussed above, the tag 108 encodes the semantic interpretation of the recognized word or phrase; additionally, in accordance with embodiments of the present invention, the tag itself encodes one or more processing steps to be executed by the processing application 106. The steps may include, for example, accessing and playing a file, fetching an URL, transferring to another step, playing a prompt, etc. In a step 208, the recognizer 102 provides the tag 108 to the processing application 106. In a step 210, the processing application executes the command embedded in the tag. For example, in certain embodiments, the processing application is a VXML browser 114; the embedded command in the tag is read and the appropriate VXML for the command to be executed by the browser 114 is generated by the server. The processing application 106 thus need not understand or otherwise process the semantic content of the tag.

As discussed above, in some embodiments of the present invention, an administrator can use a grammar programming module to program the grammar and encoded tags.

Figure 3:
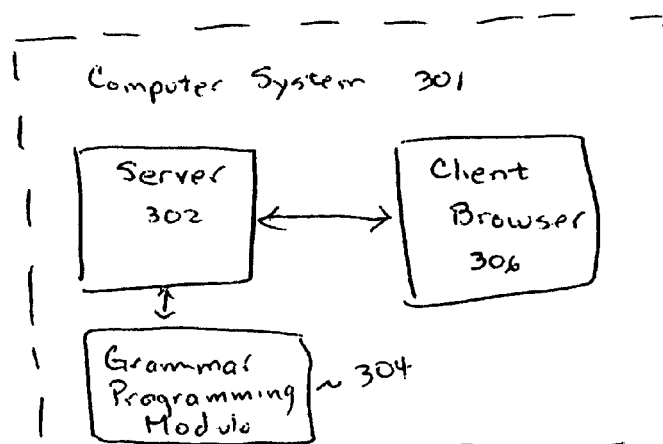
FIG. 3 is a diagram schematically illustrating a system according to embodiments of the present invention.

FIG. 3 illustrates a system for programming a grammar. As shown, the system includes a computer system 301, which for example, as illustrated, may include a server 302 and a client browser 306. The server 302 and client browser 306 may be implemented in suitably programmed computers employing, for example, Pentium type processors.

The computer system 302 may couple to, be in communication with, or include, a grammar programming module 304. More particularly, an administrator uses computer system 301 to access the grammar programming module 304 to program the words to be recognized and the tags to be accessed in response. The grammar programming module 304 may be any programming module capable of programming a grammar in accordance with the Speech Recognition Grammar Specification, suitably modified in accordance with the teachings of the present invention.

Figure 4:
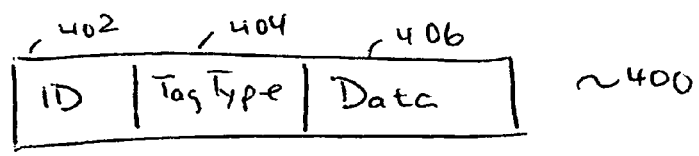
FIG. 4 illustrates an exemplary tag according to an embodiment of the present invention.

As noted above, in accordance with certain embodiments of the present invention, tags may be encoded with data specific to the invention. FIG. 4 illustrates an exemplary tag 400. As shown, the tag 400 includes a grammar ID 402, a tag type 404, and data 406, based on the tag type. In certain embodiments, the tag types are link, embedded prompt, and non-embedded prompt.

The grammar ID 402 identifies a particular grammar. The data 406 define the data within the tag 400, as reflective of the tag type 404. Thus, for a link tag, the administrator can program the link (URL) which should be transitioned to. An embedded prompt tag specifies the URL of an audio file to be played or text that is to be played using a text-to-speech application. An embedded prompt differs from a non-embedded prompt in that an embedded prompt is referenced by its URL in the grammar tag; a non-embedded prompt is referenced by an ID in the tag.

As noted above, according to certain embodiments of the present invention, the tag 400 is of the form GrammarID^tagTYPE^DATA. Thus, if the tag type is a LINK, the tag is of the form Grammar ID^LINK^URL to transition to; for an embedded prompt with audio tag, the tag is of the form Grammar ID^PROMPT^W@@Audio.wav; for an embedded prompt with text, the tag is of the form Grammar ID^PROMPT^T@@ This is the text to say; for a non-embedded prompt tag, the tag is of the form GrammarID^LINK^CMDPROMPT The processing application or VXML browser 106 receives the tag and takes action based on the tag type and its data. The VXML itself, however, is independent of the grammar. That is, for execution of any of the embedded prompt tags, as will be explained in greater detail below, the VXML is the same regardless of the grammar.

Figure 5:
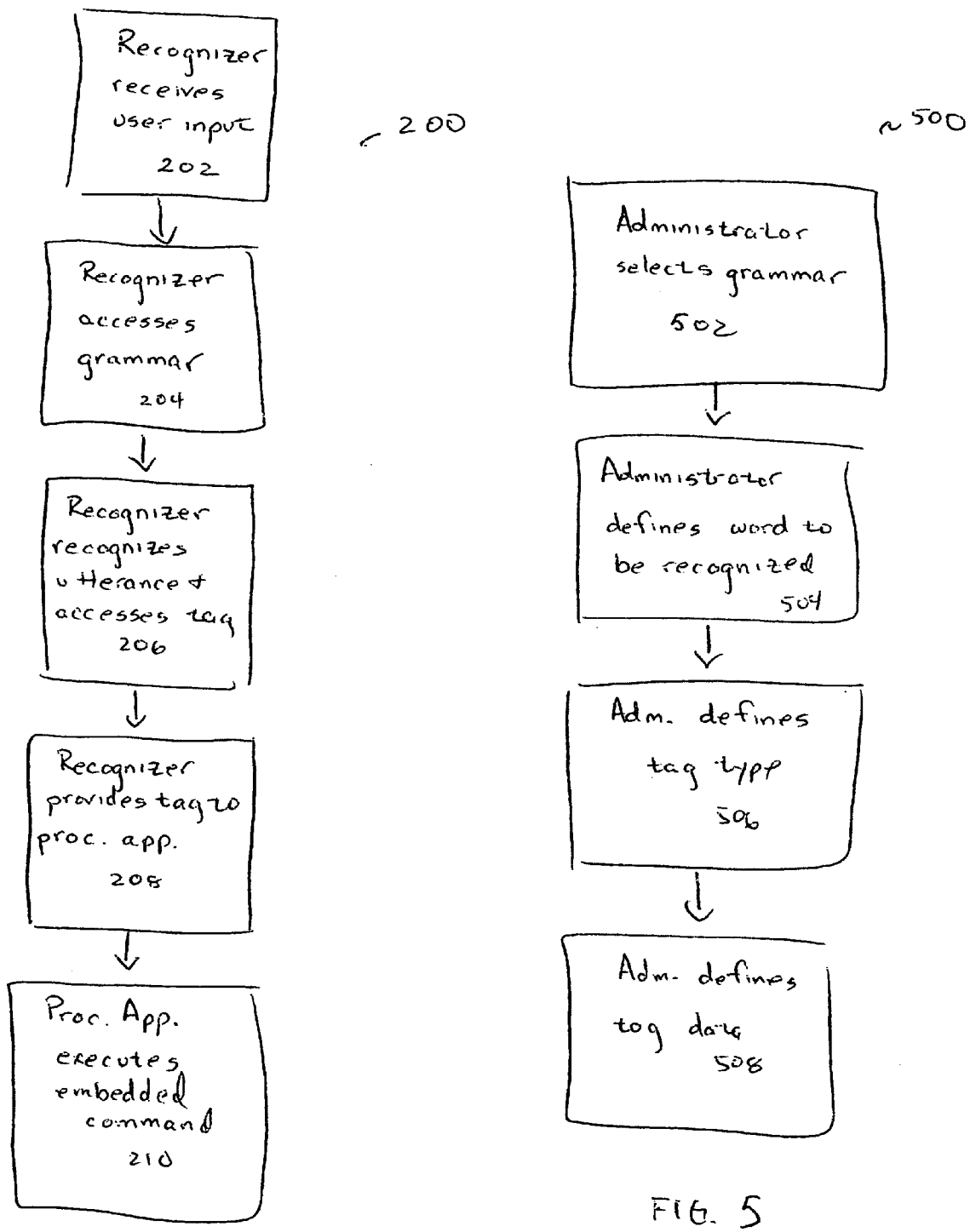
FIG. 5 is a flowchart illustrating operation of an embodiment of the present invention.

Reference is now made to FIG. 5, which illustrates a flowchart of operation of an embodiment of the present invention. The particular arrangement of elements in the flowchart 500 is not meant to imply a fixed order to the elements; embodiments can be practiced in any order that is practicable. The method may be particularly suitable for use with an interactive voice response system. In particular, FIG. 5 illustrates an administrator programming a speech recognizer in accordance with embodiments of the present invention. Typically, in such an embodiment, the administrator will log in to the server or speech recognition system using a personal computer and a client browser program.

In a step 502, an administrator can select a grammar. For example, the user can select or specify a grammar from a drop down menu; the grammar can either be provided beforehand (i.e., preprogrammed) and can be one for which the user is adding new phrases and actions, or can be a newly added grammar.

In a step 504, the administrator can define words to be recognized when spoken. Typically, this involves the administrator typing in one or more words and phrases.

In a step 506, the administrator defines a tag type 404 to be associated with the selected/defined grammars. In one embodiment, the tag types are link, embedded prompt, and prompt. A link tag defines an URL to transition to; an embedded prompt defines the file (pathname) of an audio to play or the actual text to play; and non-embedded prompt defines the complex prompt to be played.

In a step 508, the administrator defines the data 406 for the tag. For example, in the case of the link tag, he will specify the URL of the link to be transitioned to. In the case of an embedded prompt, the administrator can define an audio file and its location, or can define text that is to be converted to speech. In certain embodiments, this information is then used in accordance with SRGS to generate the complete grammar including tags.

VXML

As noted above, a speech recognition system 100 itself may be implemented as a VXML server-client system. In operation, when the grammar is defined, the VXML for the client browser to execute may be defined. The VXML also may include request prompts that instruct the user what his choices are, i.e., what words he can say in the grammar.

The VXML may include a grammar element referencing the "GrammarToBeUsed" and a script, ProcessReco( ) to process the tags. With the exception of the request prompts, the VXML looks exactly the same regardless of the grammar. Listed below are the relevant VXML elements:

```
<vxml>
...
<script> function ProcessReco( ){...this is the same for every vxml
using this special grammar}</script>
...
<!- - set up request prompt to instruct the user -- >
...
<! - - collect input -- >
<form>
    <field>
        <grammar mode="voice" src = "url for
        GrammarToBeUsed"
    <field>
    <filled>
        <! - - process the recognition results →
        <script> ProcessReco( ) </script>
        <script> handle various tag types</script>
    </filled>
</form>
</vxml>
```

Advantageously, embodiments of the present invention allow for a modular approach to speech recognition systems. That is, only the grammar needs to be defined for different applications; the processing application and recognizer can remain the same. In the embodiment discussed above, for example, the VXML can be the same across different grammars.

As noted above, in certain embodiments, the tags may be a link type, and embedded and non-embedded prompt type. The tags are executed by filled scripts at the browser 114.

When the VXML browser 114 reads the result from the recognizer and the tag is a link type tag, it extracts the URL specified in the data, and passes it to a <goto> element to perform the transition. That is If DataType is LINK extract the URL specified in the data and pass it to a <goto> element to do the transition If the data type is prompt with audio, then the VXML browser 114 will extract the audio URL, pass it to an <audio> element to play, and re-enter the <form>.

If the data is a prompt with text, then the VXML browser 114 extracts the text and passes it to an <audio> element to play, and re-enters the <form>.

A non-embedded prompt is handled slightly differently. As indicated above, a "non-embedded" prompt is encoded as "Grammar ID^LINK^CMDPROMPT". When the user speaks a word in the grammar that yields this tag, the "GrammarID" is used as a reference to identify a prompt that has been included in the VXML itself (as opposed to being embedded in the grammar). In certain embodiments, this supports, for example, play of prompts that may contain a mix of audio and text.

For each CMDPROMPT, the server 112 generates the appropriate VXML to play the prompt and the client side script that selects the prompt to play based on the GrammarID. The prompt may be complex: for example, it can include multiple audio elements of different types, it can include data dynamically generated by the server that can be rendered by a text to speech engine.

Suppose the server side determined that there were two CMDPROMPTS whose GrammarIDs are A and B, and prompts are PromptA and PromptB, respectively, then additional "filled" scripts are included in the VXML generated by the server 114:

If DataType is CMDPROMPT
    If GrammarID from the tag==A
        Play the list of audio elements—here the VXML has the prompt elements generated by the server for PromptA
    If GrammarID from the tag==B
        Play the list of audio elements—here the VXML has the prompt elements generated by the server for PromptB
    Reenter the form Confirmation Above we have described that in general the tags look like GrammarID^TagType^Data, where the Data format 406 depends on the TagType 404. Other embodiments of the present invention employ additional data formats that can be used to support confirmation of utterances and grammars that return additional data.

If the dataType 404 is LINK, additional information encoded in the tag can be used to determine if the user should be asked to confirm his selection before transitioning to the link.

The system implementing confirmation is generally similar to that just described—the grammar tag includes additional data: link data types specify the URL to transition to, and in addition identify whether Confirmation is required, and, if required, the URL of an audio file to play or of the actual text to render via text-to-speech when asking for confirmation.

The table below summarizes the tag formats so far:

| Tag Type | Output |
| --- | --- |
| Link, no confirmation | Grammar ID^LINK^URL to transition to++N |
| Link, audio confirmation | GrammarID^LINK^URL to transition to++Y+W@@Audio.wav |
| Link, text confirm | GrammarID^LINK^URL to transition to++Y+T@@the text to say |
| Embedded audio prompt: | Grammar ID^PROMPT^W@@Audio.wav |
| Embedded text prompt: | Grammar ID^PROMPT^T@@This is the text to say |
| Prompt | Grammar ID^LINK^CMDPROMPT |

The VXML for handling confirmation is generated previously described, except that the ProcessReco( ) script is enhanced to retrieve the Confirmation data (Y or N and the prompt) and VXML includes script to do the confirmation.

For confirmation, the VXML now includes another <form>, the Confirmation Form as indicated in italics below:

```
<vxml>
...
<script> function ProcessReco( ){...this is the same for every vxml
using this special grammar}</script>
...
<!- - set up instruction prompt for use -- >
...
<! - - collect input -- >
<form>
    <field>
        <grammar mode="voice" src = "url for
        GrammarToBeUsed"
```

```
-continued

<field>
    <filled>
        <!-- process the recognition results -->
        <script> ProcessReco( ) </script>
        <script> handle various tag types</script>
    </filled>
</form>
<form =id="ConfirmationForm">
    <!-- Activate a Yes No grammar -->
    ...
    <!-- Set up confirmation prompt-->
    <script> Handle various prompt types</script>
    <filled>
        <!-- if user says "yes" go to LINK -->
        <!-- if user says "no" go back to first form -->
        ...
    </filled>
</form>
</vxml>
```

For confirmation, the client VXML browser includes additional handling in filled scripts for the recognition result as indicated below:

If DataType is LINK
extract the URL specified in the data and
if confirmation is required, <goto> another <form> to handle confirmation
else pass it to a <goto> element to do the transition The ConfirmForm also includes script to play out the prompt identified in the confirmation data (see discussion for DataType=PROMPT) and wait for a yes/no response from the user.

Complex Grammars

Additional embodiments of the present invention support inclusion in the VXML of references to grammars that themselves may provide tags that include additional information for server-side processing—for description clarity, these may be referred to as XP grammars. These XP grammars can be written to recognize complex user utterances that include multiple pieces of information. For complex grammars, the data format 406 appears as follows: XP@GrammarID+Additonal Data.

For example, grammar XPM can be designed to recognize: "Play my urgent emails from Jeanne," The tag identifies (P) message priority: urgent, (P=U), (T) message type: emails (T=E), and (Sdr) sender (Sdr=Jeanne). In this scheme, the tag returned by the XP grammar can include this Additional Data: P=U&T=E&S=Jeanne. This additional information can be easily incorporated in this encoded tag invention. For this utterance, the complete encoded tag returned looks like: XPM^LINK^XP@XPM+P=U&T=E&Sdr=Jeanne The grammar could return other results, e.g, XPM^LINK^XP@XPM+P=N&T=V&Sdr=Jeanne&S=R (where V is voicemail, S=R is Status=Read) In this scheme, the client uses the tag to identify the XP grammars and the URL configured to do server side processing. For each of these XP grammars client side script uses an array to associate an XP with its URL.

The grammar programming module 304 (FIG. 3) itself may be provided to allow the user to create an XP grammar and associate that with a URL. The output of the grammar needs to set up tags that define the grammar ID, tag type=LINK, and link data: XP@GrammarID+Additional data In the example above, this is: XPM ^LINK^XP@XPM+P=U&T=E&Sdr=Jeanne For each XP grammar associated with a link, the VXML server 114 generates client side VXML to create an array (XPLinkArray) that associates the GrammarID with its URL.

Figure 6:
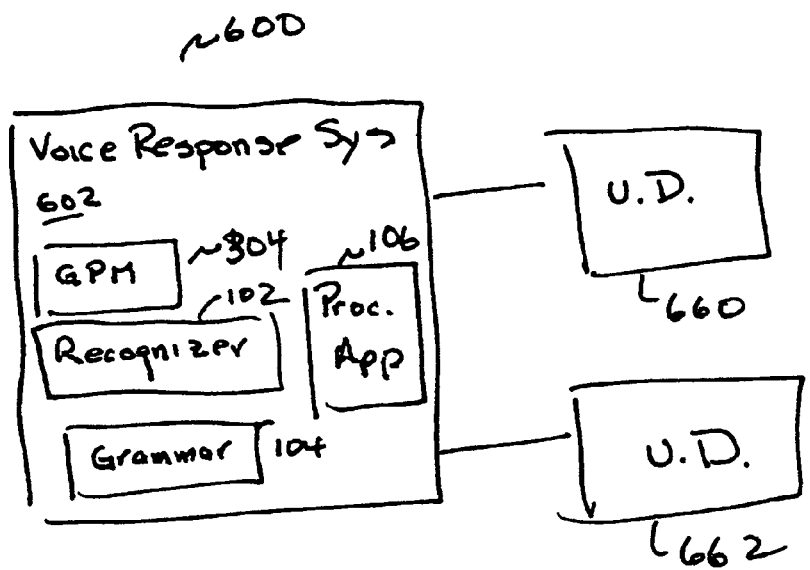
FIG. 6 illustrates a telecommunications system according to an embodiment of the present invention.

The browser includes additional "filled" scripts:
If the DataType==LINK
If the Data identifies XP grammar
Use the GrammarID to index into the XPLinkArray and recover the URL
Extract the Additional Data and append it to the URL
Pass the URL to a <goto> element and do the transition Now referring to FIG. 6, an exemplary system 600 is illustrated according to some embodiments. The system 600 includes a voice response system 602 that may include or be in communication with grammar programming module 304, recognizer 102, grammar module 104, and processing application 106.

User devices, such as the user devices 660, 662, may be connected to or in communication with the voice response system 602. In some embodiments, a user device may be or include such things as telephones, cellular telephones, PDAs, computers, etc. In addition, the user devices 660, 662 may include telephony and other multimedia messaging capability using, for example, peripheral cameras, Webcams, microphones and speakers (not shown) or peripheral telephony handsets, such as the Optipoint™ handset available from Siemens Information and Communication Networks. In particular embodiments, the user devices are implemented as devices capable of communicating with a VXML browser/speech recognition engine.

In some embodiments, the system 600 may include other hardware and/or software components (e.g., gateways, proxy servers, registration servers, presence servers, redirect servers, databases, applications), such as, for example, hardware and software used to support a SIP or other protocol based infrastructure for the system 600 and allow registration of SIP devices in the system 600.

The grammar programming module 304, recognizer 102, grammar module 104, and processing application 106 may be implemented in hardware and/or software operating on one or more servers, computer systems, host or mainframe computers, workstations, etc. In some embodiments the grammar programming module 304, recognizer 102, grammar module 104, and processing application 106 may be operating on some or all of the same device(s) as other components in the system 600.

Figure 7:
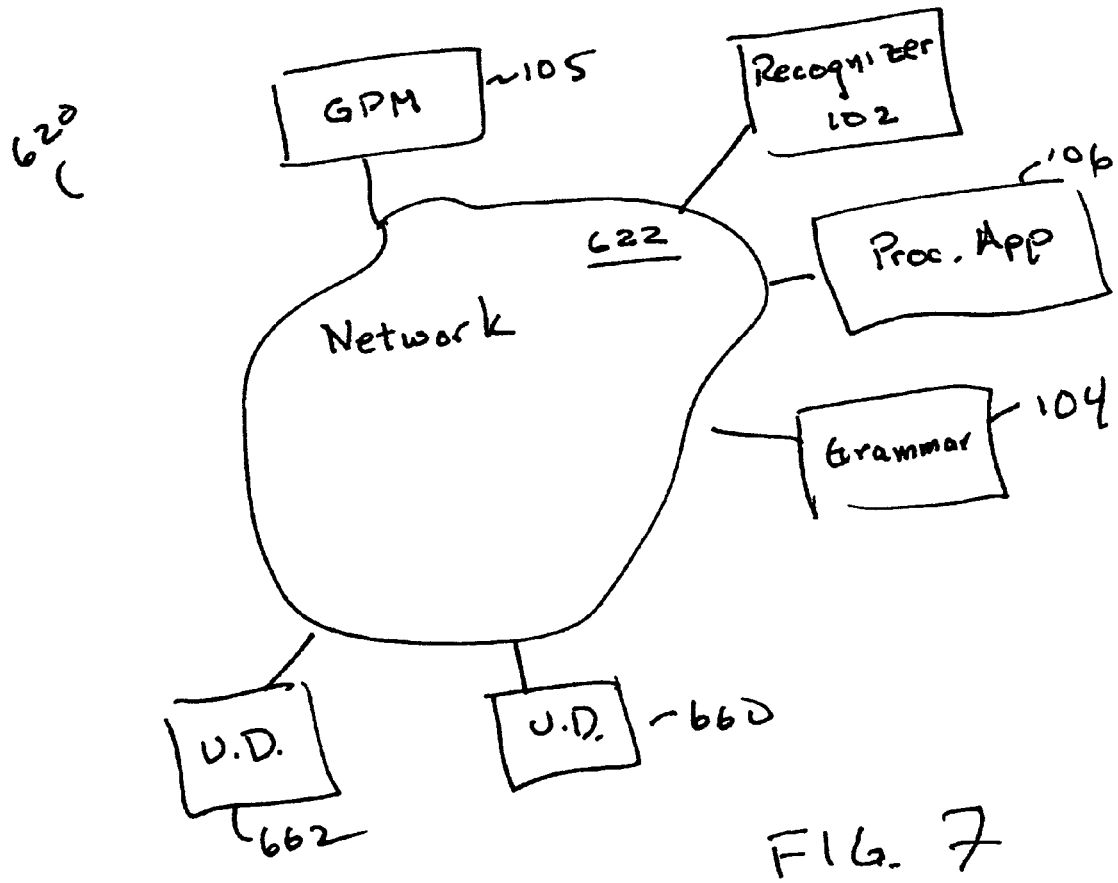
FIG. 7 illustrates a telecommunications system according to an embodiment of the present invention.

In some embodiments, one or more of the components of the system 600 may be connected or in communication with each other via a communication network. For example, now referring to FIG. 7, a system 620 including the components of the system 600 is illustrated, wherein some or all of the components are in communication via a network 622. The network 622 may be or include the Internet, the World Wide Web, a local area network, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T6 lines, DSL connections, etc. Moreover, as used herein, communications include those enabled by wired or wireless technology. In some embodiments, some or all of the network 622 may be implemented using a TCP/IP network and may implement voice or multimedia over IP using, for example, the Session Initiation Protocol (SIP).

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents.

What is claimed is:

1. A voice recognition system, comprising:
a recognizer configured to receive a voice input;
a grammar operably coupled to the recognizer, the grammar defining utterances to be recognized, the recognizer encoding tags for said received voice input responsive to defined said utterances;
a processing application configured to receive encoded said tags, each encoded tag having a semantic content and including an embedded function for said processing application, such that said processing application can process the function independent of a semantic content of the tag, each encoded tag including a grammar identification (ID), a tag type and data.

2. A voice recognition system in accordance with claim 1, wherein said processing application is a VXML application, the grammar ID identifies a particular grammar and tag types include link, embedded prompt, and non-embedded prompt.

3. A voice recognition system in accordance with claim 2, wherein the tag type is embedded prompt and said data identifies an audio file to be played.

4. A voice recognition system in accordance with claim 2, wherein the tag type is link and said data identifies an URL.

5. A voice recognition system in accordance with claim 2, wherein the tag type is non-embedded prompt and said data provides a prompt.

6. A voice recognition system in accordance with claim 2, wherein the grammar is an XP grammar recognizing utterances that include multiple pieces of information.

7. A method, comprising:
providing a recognizer adapted to receive voice input;
providing a grammar programming unit, the grammar programming unit adapted for encoding instructions and semantic content in a tag in cooperation with the recognizer, tags encoded for the received voice input responsive to defined utterances, each encoded tag including a grammar identification (ID), a tag type and data;
providing the encoded tags to a processing application configured to read and execute said instructions without processing said semantic content of said encoded tag.

8. A method in accordance with claim 7, wherein said processing application includes a VXML browser, the grammar ID identifies a particular grammar and tag types include link, embedded prompt, and non-embedded prompt.

9. A method in accordance with claim 7, wherein providing a processing application further comprises providing a processing application configured to be interchangeably usable with a plurality of grammars, each identified by a particular said grammar ID.

10. A method in accordance with claim 9, wherein the tag type is embedded prompt and said data identifies an audio file.

11. A method in accordance with claim 9, wherein tag type is non-embedded prompt and said data identifies a prompt.

12. A method in accordance with claim 9, wherein the tag type is link and said data is an URL.

13. A method in accordance with claim 9, wherein the plurality of grammars include XP grammars recognizing utterances that include multiple pieces of information.

14. A telecommunications system, comprising:
a network;
a plurality of user devices operably coupled to the network;
a voice recognition unit accessible by said user devices, said voice recognition unit including a recognizer configured to receive a voice input;
a grammar operably coupled to the recognizer, the grammar defining utterances to be recognized, the recognizer encoding tags for said received voice input responsive to defined said utterances;
a processing application configured to receive encoded said tags, each encoded tag having a semantic content and including at least one embedded function for said processing application, such that said processing application can process the function independent of a semantic content of the tag, each encoded tag including a grammar identification (ID), a tag type and data.

15. A telecommunications system in accordance with claim 14, wherein said processing application is a VXML application, the grammar ID identifies a particular grammar and tag types include link, embedded prompt, and non-embedded prompt.

16. A telecommunications system in accordance with claim 15, wherein said data identifies an audio file to be played.

17. A telecommunications system in accordance with claim 15, wherein said data identifies an URL to be processed.

18. A telecommunications system in accordance with claim 15, wherein said data identifies a prompt to be provided.

19. A telecommunications system in accordance with claim 15, wherein the grammar is an XP grammar recognizing utterances that include multiple pieces of information.

* * * * *